US006780016B1

(12) United States Patent
Toly

(10) Patent No.: US 6,780,016 B1
(45) Date of Patent: Aug. 24, 2004

(54) HUMAN SURGICAL TRAINER AND METHODS FOR TRAINING

(76) Inventor: Christopher C. Toly, 2317 W. Newton St., Seattle, WA (US) 98199

(*) Notice: Subject to any disclaimer, the term of this patent is extended or adjusted under 35 U.S.C. 154(b) by 8 days.

(21) Appl. No.: 09/695,380

(22) Filed: Oct. 23, 2000

(51) Int. Cl.$^7$ .............................................. G09B 23/30
(52) U.S. Cl. ..................................... 434/262; 434/267
(58) Field of Search ................................. 434/262, 267, 434/268, 272, 274

(56) References Cited

U.S. PATENT DOCUMENTS

| 2,689,415 A | 9/1954 | Haver |
| 2,871,579 A | 2/1959 | Niiranen et al. |
| 2,995,832 A | 8/1961 | Alderson |

(List continued on next page.)

FOREIGN PATENT DOCUMENTS

| CH | 646538 A | * 11/1984 | ........... G09B/23/28 |
| GB | 2 277 826 B | 11/1994 | |
| WO | WO 93/14483 | 7/1993 | |
| WO | WO 93/16664 | 9/1993 | |
| WO | WO 94/25948 | 11/1994 | |
| WO | WO-98/58358 | * 12/1998 | ........... G09B/23/28 |

OTHER PUBLICATIONS

Human Patient Simulator, Medical Education Technologies, Inc., <http://www.meti.com/–home.html>.*
Emergency Cricothyroidotomy, http://www.cpp.usmc.mil/schools/fmss/–Power%20Point/0410.PPT.*
Patient Simulator Program, http://www.cscc.edu/docs/nurs/patientsim.htm.*
Catalog, Everest Medical Corporation, Minneapolis, MN, Sep. 1994.
Catalog, Advanced Surgical, Inc., Princeton, N.J., at least as early as Apr. 1996.

Limbs & Things Ltd. Brochure, Bristol, England, Mar. 1, 1996, 18 pages.

*Product News*, Limbs & Things Newsletter, Nov. 1995, 4 pages.

*Primary Examiner*—Mark Sager
*Assistant Examiner*—Steven Ashburn

(57) ABSTRACT

The present invention provides a surgical trainer having a simulated human tissue structure made of an elastomeric composition and having at least one reinforcing layer of a fibrous material. The surgical trainer preferably includes three areas for practicing surgical skills. The first is the abdominal area for practicing diagnostic peritoneal lavage. In a preferred embodiment for practicing this procedure, the surgical trainer includes a simulated tissue structure including a skin layer, a subcutaneous fat layer, an anterior rectus sheath layer, a muscle layer, a posterior rectus sheath layer, an extraperitoneal layer, and a peritoneum layer. Underlying the tissue structure, the trainer includes simulated abdominal organs within an abdominal cavity. The organs and cavity can be filled with simulated bodily fluids to lend more realism to the practice procedure. The second is the chest area. Chest tube insertion and pericardiocentesis are the procedures which can be performed on the trainer for this area. In addition to the simulated tissue structure on the exterior of the chest, the trainer includes additional tissue structure in the form of a layer of simulated tissue to mimic the intercostal muscle and the parietal pleura. To be more lifelike the trainer also includes inflatable lungs to simulate breathing, and ribs. For pericardiocentesis, a sternum, ribs, a heart and additional pericardium tissue structure are included. The heart and pericardium can be filled with simulated bodily fluids to mimic the real life procedure. The third is the neck area. Cricothyroidotomy is the procedure which can be performed on this part of the trainer. In addition to the simulated human tissue structure, the trainer includes a simulated cricoid cartilage, thyroid cartilage, and cricothyroid ligament in this area.

47 Claims, 8 Drawing Sheets

U.S. PATENT DOCUMENTS

| | | | |
|---|---|---|---|
| 3,426,449 | A | 2/1969 | Van Noy, Jr. |
| 3,704,529 | A * | 12/1972 | Cioppa ....................... 434/272 |
| 4,439,162 | A | 3/1984 | Blaine |
| 4,459,113 | A | 7/1984 | Gatti et al. |
| 4,481,001 | A * | 11/1984 | Graham et al. ............. 434/267 |
| 4,596,528 | A * | 6/1986 | Lewis et al. ................ 434/270 |
| 4,767,333 | A | 8/1988 | Born |
| 4,773,865 | A | 9/1988 | Baldwin |
| 4,789,340 | A | 12/1988 | Zikria |
| 5,090,910 | A | 2/1992 | Narlo |
| 5,104,328 | A * | 4/1992 | Lounsbury .................. 463/273 |
| 5,112,228 | A | 5/1992 | Zouras |
| 5,137,458 | A | 8/1992 | Ungs et al. |
| 5,149,270 | A | 9/1992 | McKeown |
| 5,215,469 | A | 6/1993 | Kohnke et al. |
| 5,320,537 | A | 6/1994 | Watson |
| 5,425,644 | A | 6/1995 | Szinicz |
| 5,518,406 | A | 5/1996 | Waters |
| 5,518,407 | A | 5/1996 | Greenfield et al. |
| 5,620,326 | A | 4/1997 | Younker |
| 5,775,916 | A | 7/1998 | Cooper et al. |
| 6,234,804 | B1 * | 5/2001 | Young ....................... 434/267 |

\* cited by examiner

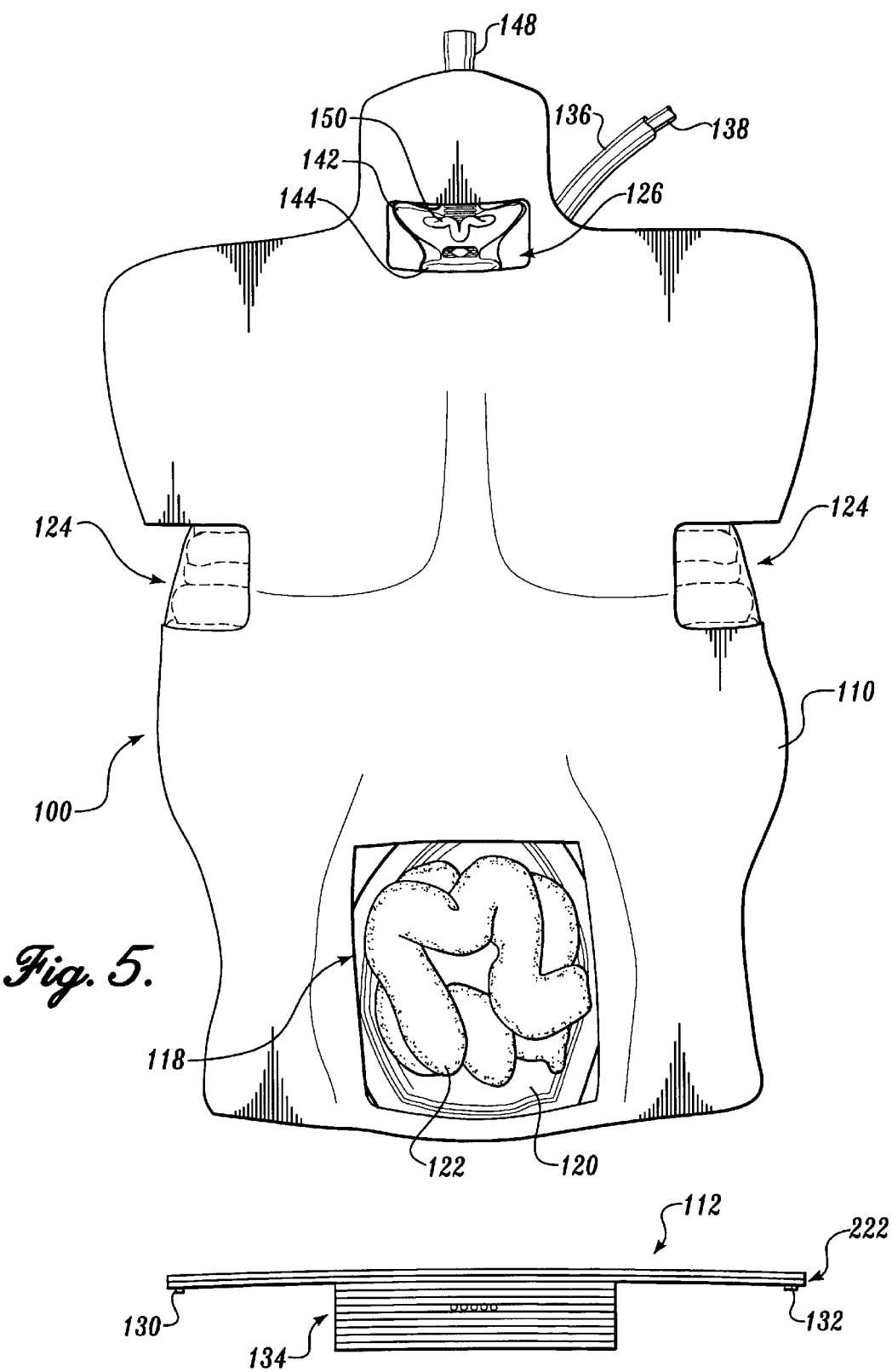

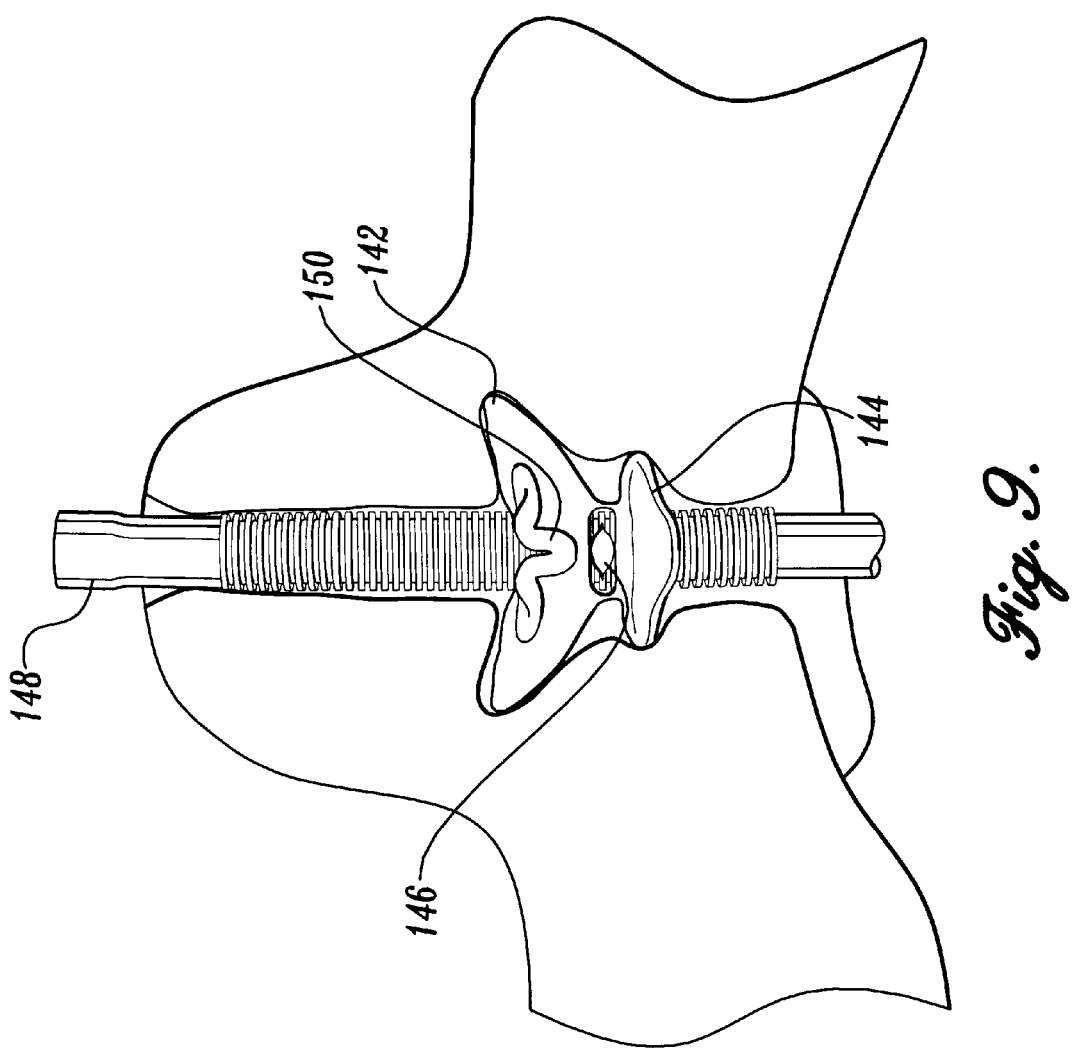

HUMAN SURGICAL TRAINER AND METHODS FOR TRAINING

FIELD OF THE INVENTION

The present invention pertains to surgical training aids, and more specifically to a human torso surgical trainer for performing trauma surgical procedures including diagnostic peritoneal lavage, chest tube insertion, pericardiocentesis, and cricothyroidotomy.

BACKGROUND OF THE INVENTION

Trauma surgical procedures include those procedures which are usually performed on a person as a result of severe trauma to aid in the diagnosis or to provide immediate life-saving care to maintain the patient alive until more complete medical treatment is available. This may include clearing a blocked airway or draining accumulations of fluids from internal organs. While appearing to be simple procedures, if done improperly, it will result in worsening of the patient's condition, and placing the patient at an even greater peril of death. By their nature, trauma procedures are usually performed while in a state of emergency. It is useful to provide training methods and apparatus to fully prepare physicians in these procedures.

Medical training and in particular medical students wishing to embark on a trauma surgery practice or practicing surgeons simply wishing to hone their trauma skills, require anatomically correct human models with realistic human tissue textures if they are to be made cognizant of what surgery on live humans is really like. Conventionally, live animals were useful for this purpose. However, the care and housing of live animals is a costly endeavor for many medical schools. Cadavers were also once a staple surgical training aid; however, unclaimed human bodies are becoming a rarity with the newer identification procedures utilizing DNA screening. Animal rights activism has also pushed for and been instrumental in ending the use of live animals for medical testing.

Human anatomical models have been proposed using elastomeric compositions for human tissue. However, to the present, there has not been a surgical trainer which includes a level of detail including the finer aspects of human tissue. The problem with previous attempts to replicate human tissue useful for surgery practice was in failing to recognize the importance of creating not just one layer of approximate overall human tissue consistency, but rather each and every layer must be faithfully replicated to provide a simulated tissue closer to the real thing. The big advance in modeling human tissue is credited to the inventors ability to replicate as accurately as possible each and every membrane of human tissue. This includes the serous membranes surrounding muscle and internal organs, which is a dense tough membrane. With more layers of varying consistencies, and intricate membrane layers, the overall result bears a remarkable similarity to the real thing.

SUMMARY OF THE INVENTION

The present invention provides a surgical trainer having a simulated human tissue structure made of an elastomeric composition and having at least one reinforcing layer of a fibrous material. The surgical trainer preferably includes three areas for practicing surgical skills. The first is the abdominal area for practicing diagnostic peritoneal lavage. In a preferred embodiment for practicing this procedure, the surgical trainer includes a simulated tissue structure including a skin layer, a subcutaneous fat layer, an anterior rectus sheath layer, a muscle layer, a posterior rectus sheath layer, an extraperitoneal layer, and a peritoneum layer. Underlying the tissue structure, the trainer includes simulated abdominal organs within an abdominal cavity. The organs and cavity can be filled with simulated bodily fluids to lend more realism to the practice procedure. The second is the chest area. Chest tube insertion and pericardiocentesis are the procedures which can be performed on the trainer for this area. In addition to the simulated tissue structure on the exterior of the chest, the trainer includes additional tissue structure in the form of a layer of simulated tissue to mimic the intercostal muscle and the parietal pleura. To be more lifelike the trainer also includes inflatable lungs to simulate breathing, and ribs. For pericardiocentesis, a sternum, ribs, a heart and additional pericardium tissue structure are included. The heart and pericardium can be filled with simulated bodily fluids to mimic the real life procedure. The third is the neck area. Cricothyroidotomy is the procedure which can be performed on this part of the trainer. In addition to the simulated human tissue structure, the trainer includes a simulated cricoid cartilage, thyroid cartilage, and cricothyroid ligament in this area.

In a preferred embodiment of the human tissue structure, the tissue includes a skin layer of silicone reinforced with a silicone coated fibrous layer, a subcutaneous fat layer of silicone underlying the skin, an anterior rectus sheath layer of silicone reinforced with a silicone coated fibrous layer underlying the subcutaneous fat, a muscle layer of silicone underlying the fat, a posterior rectus sheath layer of silicone reinforced with a silicone coated fibrous layer underlying the muscle, an extraperitoneal layer of silicone underlying the posterior rectus sheath, and a peritoneum of silicone reinforced with a silicone coated layer underlying the extraperitoneal layer. Silicone compositions can be varied for each of the individual layers to mimic the consistency of the analogous human tissue. Pigments can be incorporated to make the simulated tissue visually similar to human tissue. Layers can be bonded to one another or they can be provided as individual members. Layers can also be separated by members not a part of the tissue structure. Further, the layers can be incised and replaced when needed.

In one aspect of the invention, the simulated human tissue can include artificial venous and arterial channels. The channels can be connected to a pump via tubes. The pump draws simulated blood from a reservoir and pumps the blood through the tubes into the channels. When an incision is made in the tissue, and a simulated vein is cut, simulated blood will flood the operative site, as in real life. Preferably, the pump is manually operated such as with a syringe.

In another aspect of the invention, the human tissue structure without more can be used as a surgical trainer to practice suturing and surgical knot-tying.

In yet another aspect of the invention, the human tissue structure is replaceably fastened to the trainer so that it can be replaced when it is at the end of its useful life.

Thus, the present invention provides numerous advantages over the previous models. The present invention is closer to the true texture and consistency of human tissue. The present invention provides fine detail, which is required to faithfully perform certain steps in trauma surgical procedures. The present invention also provides the trainee with truer experiences by simulation complications which would arise if the procedure is done incorrectly.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 shows a top plan view of the trainer of FIG. 1 with the simulated tissue removed, exposing internal structures;

FIG. 6 shows a cross section view of simulated tissue constructed according to the present invention;

FIG. 9 shows a surgical practice pack for the neck area.

DETAILED DESCRIPTION OF THE PREFERRED EMBODIMENT

For the purposes of this description, human tissue, not including bone or cartilage may be divided into two classes. The first class will be that tissue whose presence in a human body fills or lends significant bulk to the body. The second class of tissue will be that tissue whose function it is to line, support or surround the first class of tissue. For the purposes of this description, the second class of tissue will be referred to as membranes or membranous tissue. By implication, the first class will be referred to as sub-membranous tissue. Membranes are generally thinner but are characterized in that they are comparatively more dense and tougher than sub-membranous tissue, this is due in part to a composite construction which also includes a fibrous layer. Types of membranes found in a human body include skin and any of the number of serous membranes, for example, the peritoneum, pericardium, or parietal pleura; and any of the number of fasciae or connective tissue, for example, the deep fascia which binds muscles such as the anterior and posterior rectus sheath or aponeuroses, ligaments and tendons. Sub-membranous tissue, such as fat, muscle or extra-peritoneal tissue, by comparison occupies more space and is generally easier to dissect than membranes. However, even between tissues which are sub-membranous, there can be a great disparity in tissue consistency. For instance, fat is much easier to dissect than muscle. In some instances requiring only the blunt end of a scalpel. Given the need to provide realistic simulation and training models, it is therefore appropriate to impart a level of realism to surgical trainers which are capable of providing the subtle differences between membranous and sub-membranous tissues.

Figure 1:
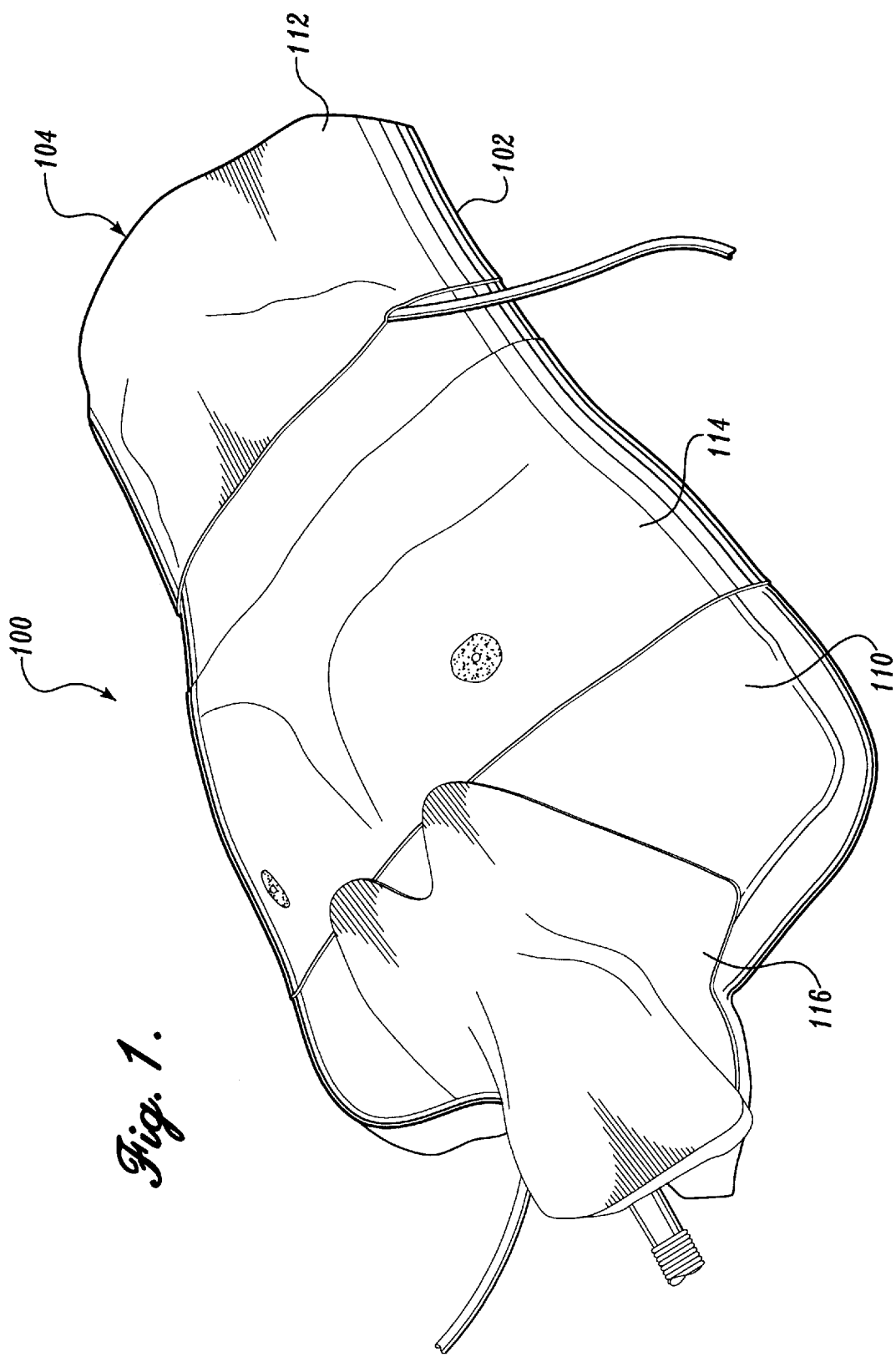
FIG. 1 shows a perspective view of a human torso surgical trainer constructed according to the present invention.

A surgical trainer constructed in accordance with the present invention is shown in FIG. 1. The trainer 100 is substantially proportional to the dimensions of a fully grown average male torso. However, in another aspect of the invention, the surgical trainer 100 is also provided in proportions of the fully grown average female. And in yet another aspect of the present invention, the trainer is provided in proportions of a small child and infant. The trainer 100 suitably rests on a base 102, the base 102 preferably being contoured to the trainer's dimensions. The trainer 100 is buttressed by underlying structures, giving realistic shape and appearance to the trainer 100 as though a complete muscular and skeletal system undergirded the exterior body cover 110. The body cover 110 is made from an elastomeric material. Preferably, the body cover 110 is pigmented to present a visually similar appearance to that of a human. The trainer's lower boundary 104 is roughly commensurate with the lower abdomen, parts of the hypogastric and iliac areas have been included, but the lower extremities have been omitted. From the lower abdomen, the trainer continues to follow the outline of an average sized male torso. Lumbar and hypochondriac, medial and lateral areas, as well as umbilical and epigastric areas are faithfully replicated. The trainer 100 concludes with the upper chest and includes the upper neck portion. Upper extremities have been omitted. Preferably, the trainer includes swatches of simulated human tissue structure draped over practice surgery areas and over areas of the body cover 110, and are fastened to the trainer 100 with, preferably, hook and loop fasteners or snap fasteners (not shown). This is because the surgical practice tissue is incisable and is intended to be replaced after its useful life. Thus, the practice surgical swatches need only be replaced instead of the body cover. Preferably, the practice surgery areas include the abdomen, the chest, and neck areas. Each of the practice areas may include further simulated anatomical features and more tissue structure which will be described below.

Figure 2:
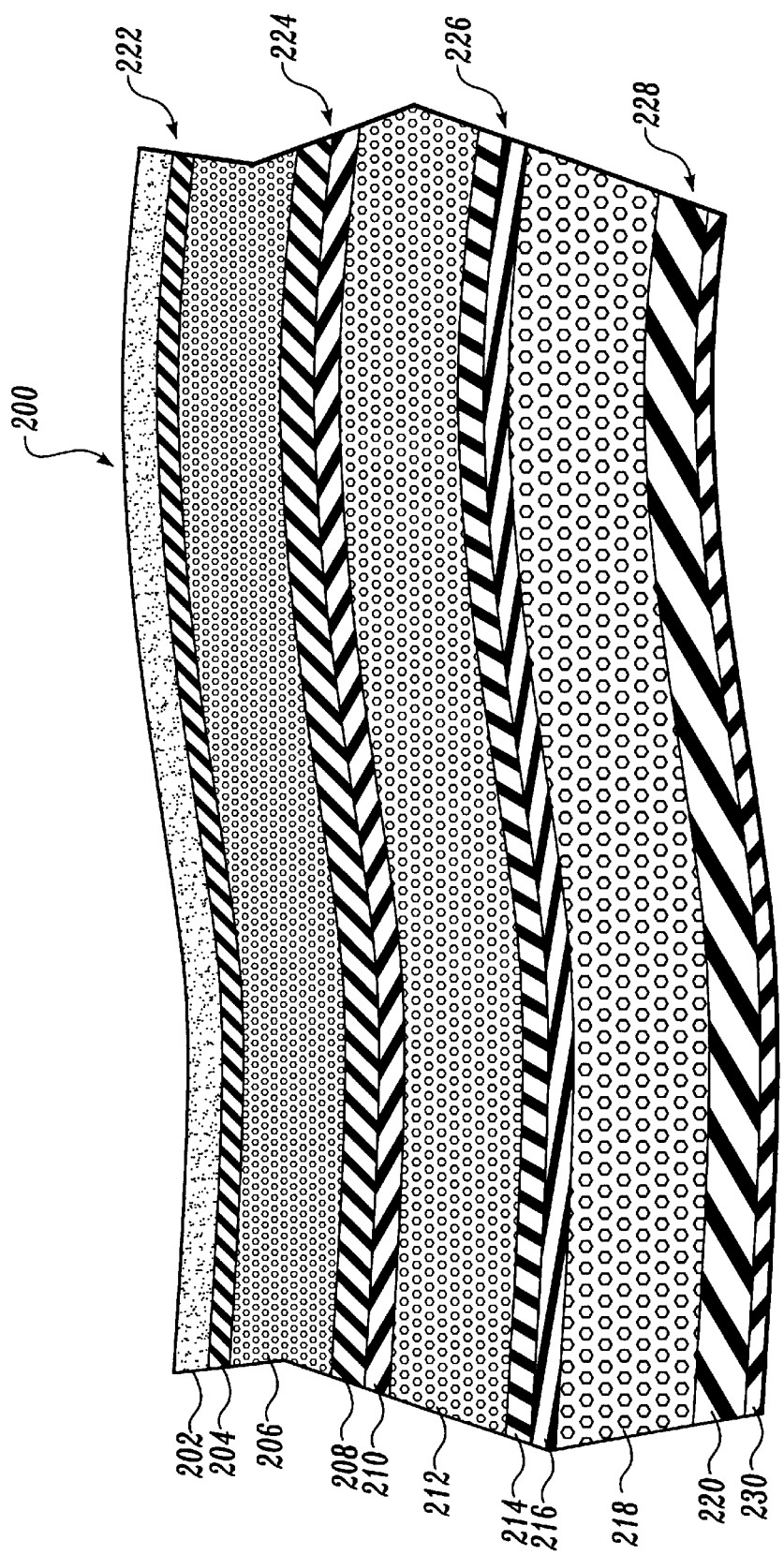
FIG. 2 shows a schematic representation of simulated human tissue constructed according to the present invention.

Still referring to FIG. 1, the trainer includes an abdomen surgical practice area with abdomen tissue 112. The abdomen area is preferably used to perform diagnostic peritoneal lavage. Preferably, the abdomen includes the simulated human tissue of FIG. 2 to cover the underlying simulated viscera. The trainer 100 includes a chest surgical practice area with a chest tissue structure 114. The chest area is preferably used to perform both the chest tube insertion procedure and pericardiocentesis. Preferably, the chest area includes the simulated tissue of FIG. 2 to cover the underlying simulated viscera. The trainer 100 includes a neck surgical practice area with neck tissue structure 116. Preferably, the neck area includes the simulated tissue structure of FIG. 2 to cover the underlying viscera. The neck area is preferably used to practice cricothyroidotomy. The trainer 100 includes the underlying laryngeal cartilages and trachea in the neck area. While FIG. 2 is the preferred embodiment, other tissue structures made in accordance with the present invention are in keeping with correct human anatomy for a particular area, meaning more or less layers are possible. While the trainer 100 has been designed with certain surgical procedures in mind, the trainer 100 according to the present invention is useful for the practice of other procedures involving those areas mentioned above.

The trainer 100 includes both exterior and interior structures and features which impart a lifelike quality to the trainer to better prepare medical students for real operations. The exterior tissue members covering the surgical practice areas, of which there are preferably three, are incisable and suturable owing to a fibrous layer within the simulated human tissue. Preferably, the simulated human tissue is secured to the trainer by hook and loop fasteners or snap fasteners, thereby making the exterior tissues replaceable at the end of their useful life. However, fasteners are optional.

Referring now to FIG. 2, a preferred simulated human tissue constructed according to the present invention is shown. Alternates to the preferred embodiment may have more or less layers, to simulate the different anatomical features for a given area of the human body. The simulated human tissue structure 200 is the visible exterior in the surgical practice areas as shown in FIG. 1. The simulated human tissue 200 of FIG. 2 preferably includes a number of strata of an elastomeric composition so as to replicate the actual layered membranes and sub-membranes of a human body. The layers may be of similar formulation or they may be of different formulations depending on the human tissue which is being simulated. For instance, simulated fat would be of a different consistency from simulated muscle. As used herein, a stratum, or layer is used to denote a substantially uniform area extending in a longitudinal direction. Layers in the human tissue structure may be bonded to one another or they may be individual layers which are placed atop one another without being bonded. Layers may even be separated by members not a part of the human tissue structure. Further, for any given surgical area, the human tissue structure 200 layers can vary in thickness.

Beginning with the uppermost and outermost layer, composite layer 222 simulates human skin. For the purposes of this description, skin will be considered a membranous layer. The skin layer 222 includes a silicone blend 202 and a reinforcing silicone coated fibrous layer 204, and preferably a pigment. It is generally known in the elastomer arts, any of a number of suitable pigments for silicone blends. The silicone used in the invention is preferably obtained from Silicones, Inc. of High Point, N.C., under the mark XP-153A. Preferably, the silicone is mixed with a thinning agent also obtained from Silicones, Inc., under the mark GI Thinner. The percentages of silicone to thinner may be adjusted more or less to arrive at a suitable hardness and texture, but preferably the volume ratio is between about 2:1 of silicone to thinner to about 10:1 of silicone to thinner. It is generally known in the elastomer arts, how to mold and cure items of silicone and thinner. Although silicone has been found to perform best, other elastomeric materials, such as latex, may also be used. The silicone coated fibrous layer 204 is preferably pre-formed and cured, and is then applied below or atop an uncured silicone formulation while in the mold; as the silicone formulation cures, the pre-formed fibrous layer is bonded thereto. However, other alternates can have the silicone coated fibrous layer non-bonded to the silicone blend layer. The silicone-coated fibrous layer 204 imparts a realistic resistance to cutting, similar to real skin. The fibrous layer has been found to be preferably made of a nylon mesh material. However, a felt material will perform equally well under some circumstances. Any number of synthetic or natural fibers will also be effective to some degree. For instance, in the abdomen area, felt is the preferred fibrous material for the silicone-coated fibrous layer. While the skin is intended to be as close an approximation to actual human skin, it is to be recognized that real human skin includes numerous strata of virtually imperceptible differences. The simulated skin of the present invention, however, closely pertains to the epidermis and dermis of human skin. Preferably, a pigment is added in the silicone blend to color the skin to something akin to human skin. Preferably, the composite skin layer 222 including the fibrous layer 204 is about 2 to about 4 millimeters. While the preferred embodiment of the skin layer 222 includes a reinforcing silicone coated fiber layer 204, more reinforcing layers are possible.

Underlying the skin layer 222 is layer 206 to simulate the subcutaneous fat found in actual human tissue. For purposes of this description, subcutaneous fat will be considered a sub-membranous layer. The subcutaneous fat layer 206 includes a silicone blend and preferably a pigment. The subcutaneous fat layer 206 is preferably formulated from silicone, however, to simulate the less dense texture of fat, the formulation has adjusted from that used for skin. The volume ratios of the fat layer are preferably about 1:1 silicone to thinner to about 2:1 silicone to thinner. The fat layer 206 is similar in texture and hardness to a layer of subcutaneous fat found in humans. In humans, the subcutaneous fat is a thin layer of loose fatty tissue underlying the skin and binding it to layers underneath. It is optional to provide a fibrous material or fibrous layer in the fat or to add pigments. Preferably, the subcutaneous fat layer 206 is about 10 to about 60 millimeters.

Underlying the layer of subcutaneous fat 206 is a composite layer 224 called the anterior rectus sheath. For purposes of this description, the anterior rectus sheath will be considered a membranous layer. The anterior rectus sheath layer includes a silicone blend 208 and a reinforcing silicone coated fibrous layer 210. Preferably, the fibrous material is a nylon mesh, however, SPANDEX has been found to perform appropriately as well. The fibrous layer 210 is pre-formed as well, and bonded to anterior rectus sheath layer 208 by the same method described above. However, the fibrous layer 210 can be provided as a non-bonded layer as well. The formulation of silicone and thinner is preferably in the range of about 1:0 silicone to thinner to about 2:1 silicone to thinner. Silicone alone with no thinner may be used because the rectus sheath is a dense, tough serous layer, and this is reflected in having little to none of the thinner. Preferably, the silicone used for the anterior rectus sheath 224 is of a different consistency than the one used for the skin 222 or the subcutaneous fat 206 layers. The silicone preferably used in the anterior rectus sheath 224 is obtained from Silicones, Inc. under the name GI-1000A. This formulation of silicone is of a higher specific gravity, therefore, upon curing will be denser than the skin 222 or fat 206 layer. For the sake of comparison, the lighter silicone, XP-153A, has a specific gravity of about 0.98, while the more dense silicone, GI-1000A has a specific gravity of about 0.99. Preferably, the anterior rectus sheath layer 224 is about 0.5 to about 1.5 millimeters and more preferably about 1.0 millimeter. While the preferred embodiment of the anterior rectus sheath layer 224 includes a reinforcing silicone coated fiber layer 210, more reinforcing layers are possible.

Underlying the anterior rectus sheath layer 224 is a layer of muscle 212. For purposes of this description, muscle will be considered a sub-membranous layer. The muscle layer 212 includes a silicone blend and preferably a pigment. The muscle layer 212 is preferably formulated from silicone, however, in this case, of the two silicones mentioned above, it is preferable to use the less dense silicone, XP153A. The formulation is adjusted to achieve texture and consistency of real muscle. Therefore volume ratios of the muscle layer 212 are preferably about 1:0 silicone to thinner to about 4:1. Muscle layer 212 can be supplemented with the addition of more tissue structure in the chest area by the addition of more layers. While it is understood that in actuality there may be more or less muscles in certain areas of the abdomen and sides and anterior chest, the inventor has solved the problem by providing a distinct member, which is underlying the simulated tissue and body cover, to make up for any muscle which is not distinctly provided for in the tissue structure of FIG. 2. This additional layer will be discussed in greater detail below. It is also optional to provide a fibrous material or layer in the muscle or to add pigments.

Underlying the muscle layer 212 is a layer called the posterior rectus sheath 226. For purposes of this description, the posterior rectus sheath will be considered a membranous layer. The posterior rectus sheath layer 226 includes a silicone blend 214 and a reinforcing silicone coated fibrous layer 216. Preferably, the fibrous material is a nylon mesh, however, SPANDEX has been found to perform appropriately as well. The fibrous layer 216 is pre-formed as well, and bonded to the anterior rectus sheath layer 226 by the same method described above. However, fibrous layer 216 can be provided as a separate and distinct layer. The formulation of silicone and thinner is preferably in the range of about 1:0 silicone to thinner to about 2:1 silicone to thinner. This is because the posterior rectus sheath 226 in humans is a dense, tough serous layer, and this is reflected in having little to none of the thinner. Preferably, the silicone used for the anterior rectus sheath 226 is the silicone GI-1000A. Preferably, the posterior rectus sheath layer 226 is about 0.5 to about 1.5 millimeters and more preferably about 1.0 millimeter. While the preferred embodiment of the posterior rectus sheath 226 includes a reinforcing silicone coated fiber layer 216, more reinforcing layers can be added.

Underlying the posterior rectus sheath layer 226, is the extraperitoneal tissue layer 218. For purposes of this description, the extraperitoneal tissue will be considered a sub-membranous layer. Extraperitoneal tissue 218 is tissue which is similar in consistency to fat. The extraperitoneal tissue layer 218 includes a silicone blend and preferably a pigment. The extraperitoneal tissue layer 218 is preferably formulated from the silicone XP-153A, to simulate the less dense texture to extraperitoneal tissue. The volume ratios of silicone to thinner for the extraperitoneal tissue layer 218 are preferably about 2:1 silicone to thinner to about 1:1 silicone to thinner. The extraperitoneal tissue layer 218 is similar in texture and hardness to a layer of extraperitoneal tissue found in humans. It is optional to provide a fibrous material or layer in the extraperitoneal tissue layer or to add pigments. Preferably, the extraperitoneal layer 218 is about 4 to about 10 millimeters.

Underlying the extraperitoneal layer 218 is a composite peritoneum layer 228. For purposes of this description, the peritoneum will be considered a membranous layer. The peritoneum 228 is a smooth transparent surface membrane that lines the cavity of the abdomen of a human. In the simulated human tissue, the peritoneum 228 includes a silicone blend 220 and a reinforcing silicone coated fibrous layer 230. Preferably, the fibrous material is a nylon mesh, however, SPANDEX has been found to perform appropriately as well. The fibrous layer 230 is pre-formed as in other membranous tissue, and bonded to the layer 220 by the same method described above. However, fibrous layer 230 can be provided as a separate and distinct layer. The formulation of silicone and thinner is preferably in the range of between about 1:1 silicone to thinner to about 1:0 silicone to thinner. This is because the peritoneum is a dense, tough layer. Preferably, the silicone used for the peritoneum is GI-1000A because of its higher density. Preferably, the peritoneum layer 228 is about 0.5 to about 1.5 millimeters, and most preferably, about 1.0 millimeter. While the preferred embodiment of the peritoneum layer 228 includes a reinforcing silicone coated fiber layer 230, more reinforcing layers are possible.

Figure 3:
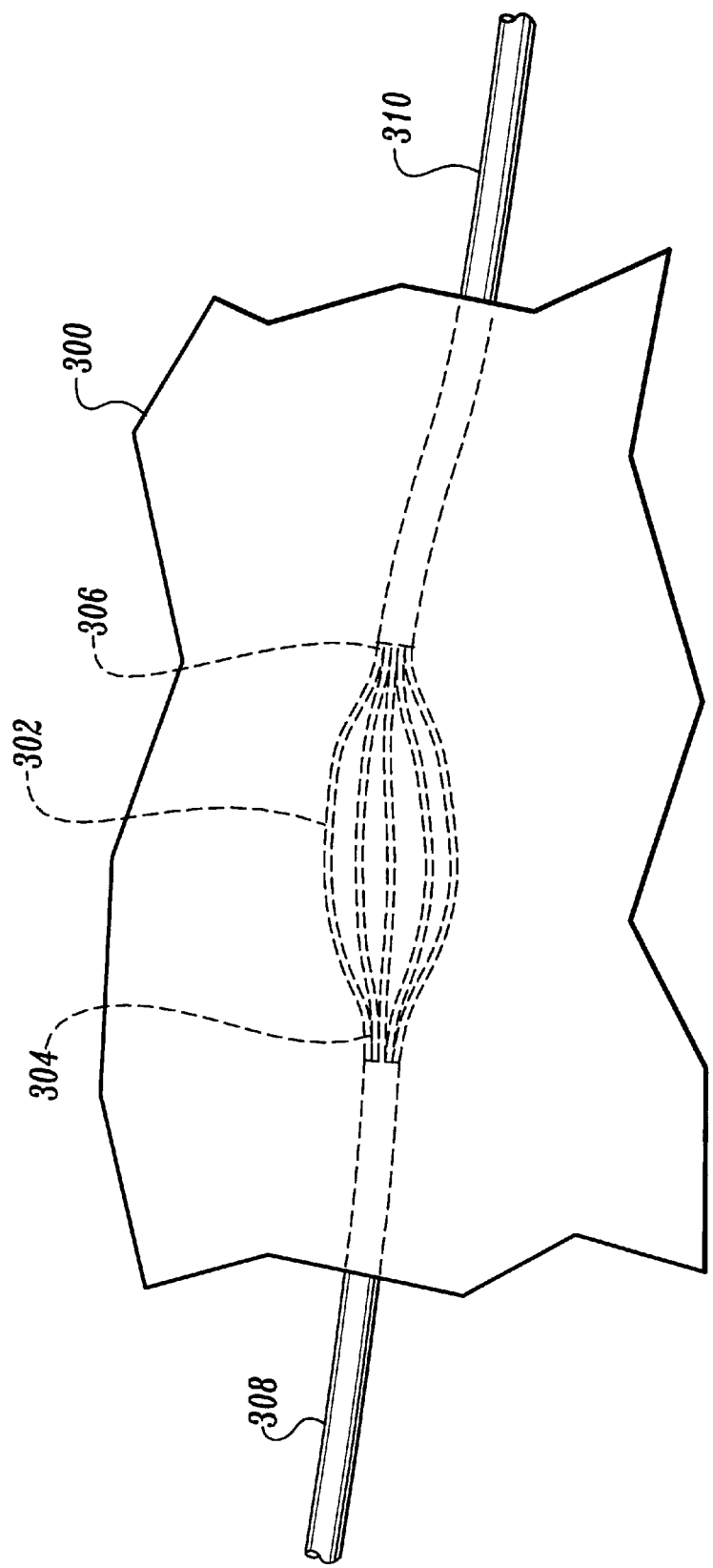
FIG. 3 shows a plan view of human tissue with simulated venous and arterial channels constructed according to the present invention.

Referring now to FIG. 3, another aspect of simulated human tissue 300 according to the present invention is the ability to include venous or arterial channels 302 to simulate real veins or arteries. The channels 302 are formed by placing lengths of string or other material, such as fishing line in the mold in any suitable configuration. Large diameter line or string will result in larger diameter simulated veins. Small diameter strings can be connected to larger ones at common junctures 304, 306 just as real capillaries connect to larger veins in a real body. The strings are arranged within the mold before or even after the silicone blend is poured. When cured, the strings can be simply pulled out from the casting leaving channels 302 which serve as the veins. Flexible hoses or tubing 308,310 can be connected to junctures 304, 306 respectively, where a number of smaller channels have converged. In this manner the simulated human tissue 300 can have a simulated circulatory system modeled therein. The tubing 308 in turn is connected to the discharge of a pump (not shown). Simulated blood resides in a reservoir (not shown). Preferably, a manually operated pump, such as a syringe with plunger is used. Tubing 308, 310 connected at junctures 304, 306 will thus form a path from reservoir to pump to tissue. In another alternate, a closed loop can be formed where the reservoir serves as a return sump fed by tube 310. A mechanical pump can continually feed the tissue structure. A peristaltic pump can be used to simulate the pulsating rhythm of a real beating heart. Preferably, the flow rate is also controlled. The veins and arteries 302 can be provided in every layer of the tissue structure or in only one layer or no layer. When a simulated vein is severed while there is simulated blood in the system, the trainee sees, simulated blood filling the operative site, just as would occur if the trainee were operating on a live patient. The simulated blood is made from a formulation including water colors. A preferable formulation includes a ratio of 1:1 water color paint to water.

Figure 4:
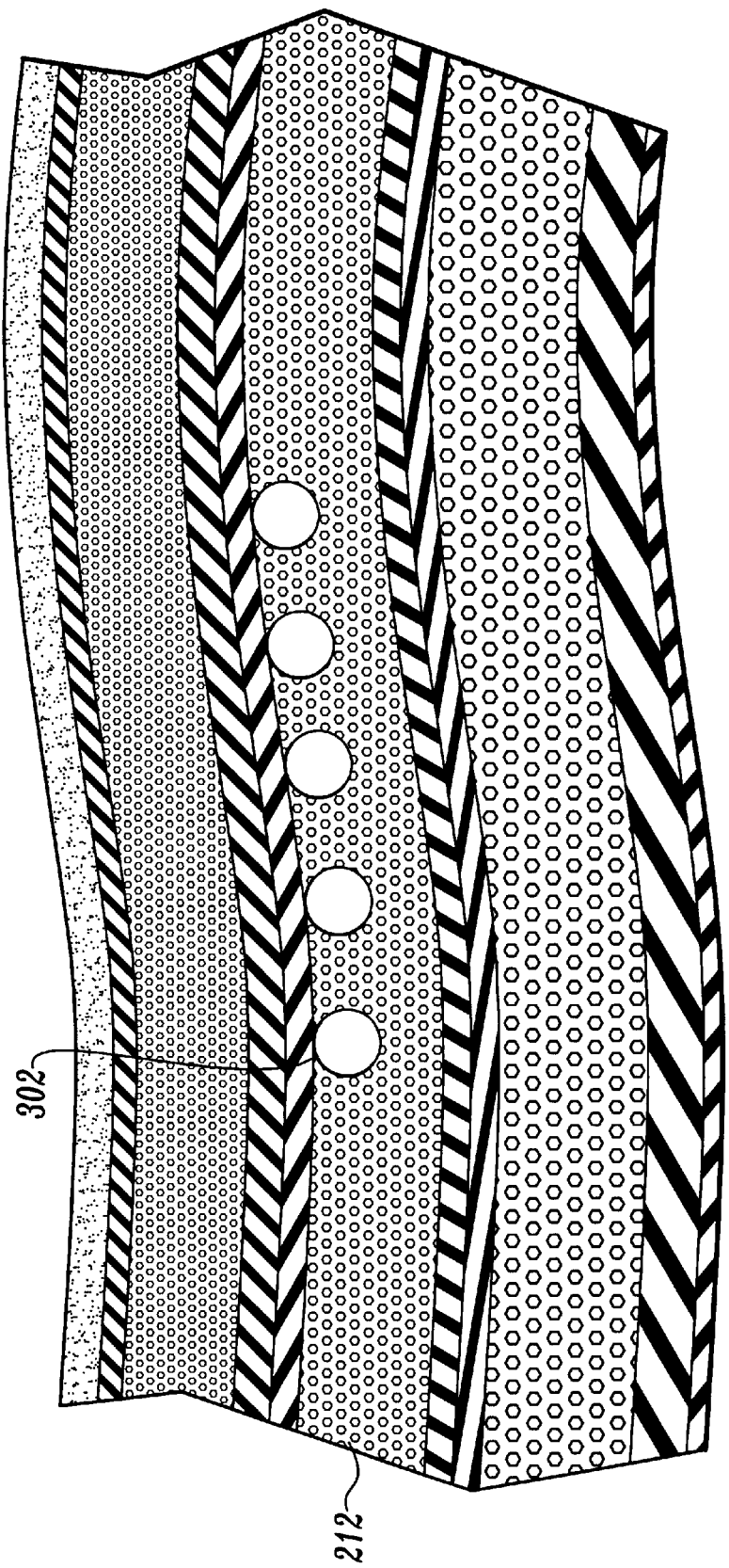
FIG. 4 shows a cross-sectional view of the simulated human tissue of FIG. 3.

Referring now to FIG. 4, the simulated human tissue of FIG. 2 is shown with venous or arterial channels 302 provided in the muscle layer 212. Preferably the venous and arterial channels 302 are provided in the muscle layer 212, however, other layers may be provided with similar arterial or venous channels. Any number of channels 302 of any size may be provided to correlate to what is found in the human body.

Referring now to FIG. 5, the swatches of exterior simulated human tissue structure have been removed from the three surgical training operative sites exposing the body cover layer 110 over the structure, but interior structure is visible in the operative areas. This is because the body cover 110 is preferably not intended to be frequently replaced as the tissues covering the practice areas which are intended to be used for practicing incisions. Preferably, the body cover 110 is likewise made of an elastomeric composition, which preferably includes silicone. Preferably, the body cover 110 includes multiple layers of silicone. Preferably, a thicker layer made from GI 1000 silicone can be provided as a coating to assist durability. FIG. 5 shows the operative site 118 relating to the abdominal region for practicing diagnostic peritoneal lavage includes simulated human organs enclosed within a simulated abdominal cavity. The abdominal cavity 120 is provided for by a structural member shaped accordingly to provide the contours of the hip bones and muscles. Preferably, the simulated large intestine 122 is made from silicone and preferably includes a silicone coated fibrous layer as well. Methods for making simulated organs have been described in U.S. Pat. No. 5,951,301 to Younker, which is herein incorporated by reference. The simulated large intestine 122 can be filled with simulated bodily fluids to model the accidental laceration by an errant scalpel. The simulated abdominal cavity 120 can also be filled with simulated bodily fluid to provide for a more realism when performing the diagnostic peritoneal lavage procedure. For instance, after an incision has been made on the exterior tissue 112, the procedure may call for extending a gloved finger into the incision to feel for complications of the abdominal cavity. The trainer according to the present invention thus provides an opportunity for the trainee to perform this step.

Referring now to FIG. 6, a cross sectional view of the preferred abdominal simulated human tissue structure 112 is shown. This tissue 112 includes the layers shown in FIG. 4, however, the uppermost, exterior skin layer 222 has been expanded longitudinally to form a band which drapes across the abdominal operative site in the trainer. Preferably, the undersides of the ends of the band have been provided with fasteners 130, 132 which can be attached to one another or to fasteners provided on the underside of the trainer. The plug 134 of human tissue, seen in exaggerated scale, fits over the exposed cut out area 118 in the body cover 110 and in the abdominal area. Similar plugs of tissue may be used over the other cut out exposed areas 124, 126.

Figure 7:
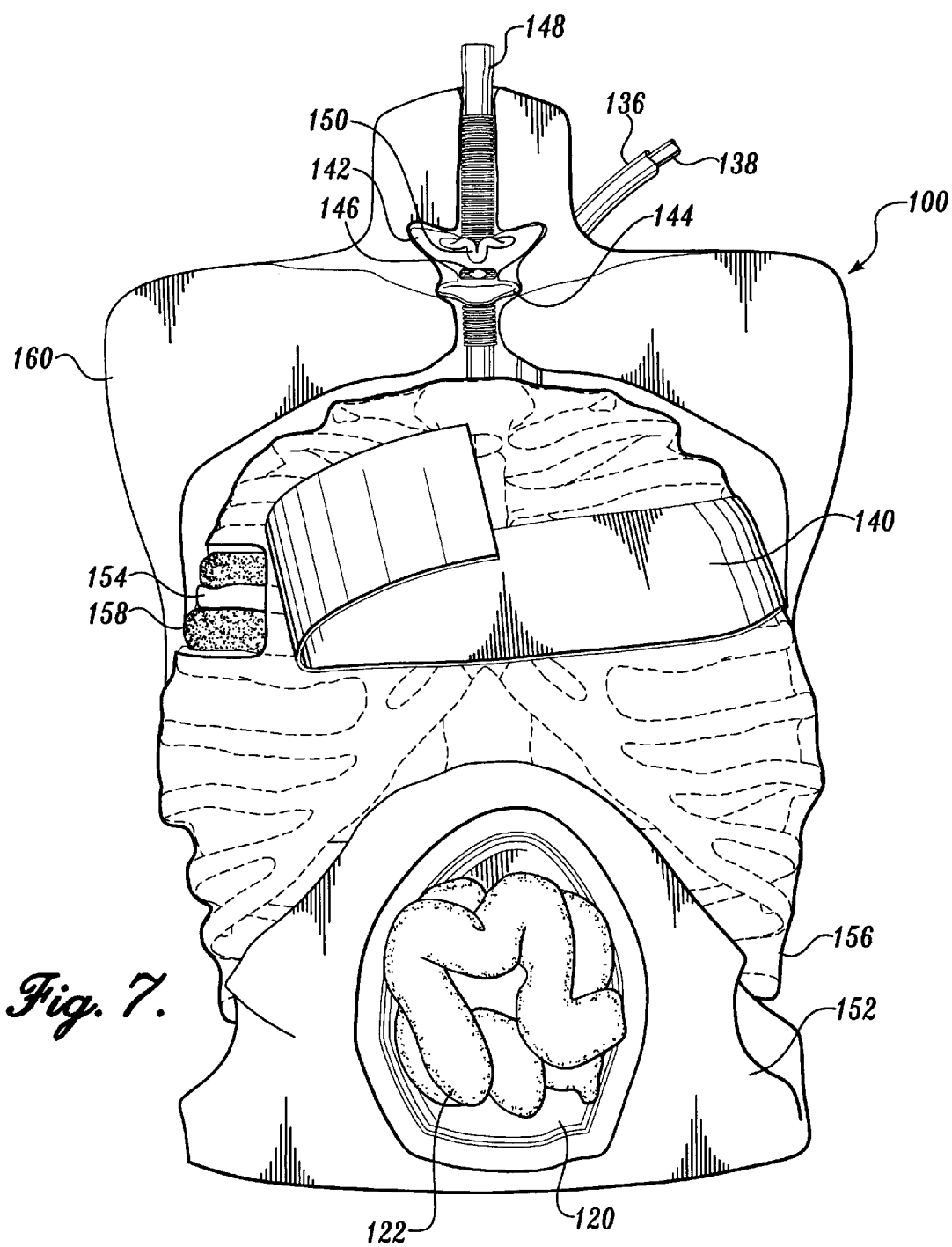
FIG. 7 shows a top plan view of the trainer of FIG. 5 with the exterior cover removed, exposing more internal structures.

Referring now to FIG. 7, the surgical trainer 100 includes additional tissue structure 140 to simulate intercostal muscle. Additional tissue structure layer 140 is in the form of a band and placed over the region of the chest. For purposes of this description, the intercostal muscle layer can be considered a sub-membranous layer. Preferably, the intercostal muscle layer can be provided with a membranous layer (not shown) to simulate the parietal pleura. For purposes of this description the parietal pleura can be considered a membranous layer. The intercostal muscle layer and the parietal pleura also form part of the human tissue structure. However, in keeping with the invention, these layers can be provided separate and apart from the exterior structure. The intercostal muscle layer 140 is pierced or incised when performing both chest tube insertion and pericardiocentesis procedures. The intercostal muscle layer 140 is preferably attached to the trainer 100 through the use of hook and loop fasteners or snap fasteners (not shown) at the rear of the trainer. The intercostal muscle layer 140 is preferably formed from a silicone formulation. The intercostal muscle layer may have one or more elastomeric layers with one or more reinforcing layers of fibrous material to simulate the parietal pleura. Preferably, the intercostal muscle layer is formed from GI 1000 silicone. Preferably, if the parietal pleura is included, it is formed from a nylon coated mesh with GI 1000 silicone. In a human body, the parietal pleura forms a sac around the chest cavity, which encloses the lungs.

Referring to FIG. 5, the surgical trainer 100 also includes in the area of the neck region, a simulated thyroid cartilage 142, a simulated cricoid cartilage 144, and a simulated cricothyroid ligament 146. The cricoid 144 and thyroid 142 cartilages are molded of suitable thermoplastic or polymeric materials. Preferably, a rubber such as POLY-FAST 72-40 RTV liquid rubber, obtained from the Polytek Development Corporation of Easton, Pa., can be used to fabricate these pieces. Referring to FIG. 9, a more detailed view of these structures is shown. In real life, these structures form part of the respiration system; they include a trachea, modeled here by a plastic tube 148 of similar consistency and resistance to cutting as the real trachea. The trachea 148 is connected to the cricoid cartilage 144 which is thicker and stronger than the thyroid cartilage 142. The thyroid cartilage 142 is the largest of the laryngeal cartilages (others have been omitted for clarity). The thyroid cartilage 142 includes the laryngeal prominence 150, better known as the Adam's Apple and the thyroid notch. In a trainer modeled after a female, the laryngeal prominence will be almost imperceptible. The cricothyroid ligament 146, here represented as integral with the trachea member, but, in real life connects the cricoid 144 and thyroid 142 cartilages. The cricothyroid ligament is modeled by a suitable plastic tubing 148 or hose of similar consistency and resistance to cutting as the real cricothyroid ligament 146. The thyroid and cricothyroid cartilages are modeled from a unitary molded piece which has an aperture traversing longitudinally along the mid axis, so as to fit through the trachea 148.

Referring now to FIG. 7, the body cover 110 of the surgical trainer 100 has been removed, exposing the next structural layer. In the abdominal region, a member simulating the abdominal cavity has been provided so as to form the shape and provide support for the abdominal region including both the upper and lower regions of the abdomen. Abdominal member 152 provides support in the area of the hypogastric, the umbilical and the epigastric portions of the abdomen, and also the lumbar and iliac regions laterally and medially thereof. The abdominal member 152 is formed from any suitable thermoplastic or polymeric material. Preferably, a polyurethane foam, such as TC-265 A/B, available from BJB Enterprises Incorporated, is used to fabricate the abdominal member. As mentioned previously, the abdominal member 152 includes abdominal cavity 120, wherein, simulated intestines 122 reside.

Still referring to FIG. 7, the trainer 100 includes a rib cage 154 (shown in phantom). The rib cage 154 is preferably made of a unitary construction of a thermoplastic and/or polymeric material giving shape to the chest region. The rib cage 154 is covered by a rib cover 156. The rib cover can be formed of one or several layers, bonded or non-bonded to one another. The rib cover 156 simulates several of the muscles surrounding the ribs, such as the serratus anterior muscle, the latissimus dorsi muscle and the external abdominal oblique muscle. For the purpose of this description, the rib cover and its muscle layers will be considered a sub-membranous layer. The rib cover 156 includes cut-out areas lateral and medial of the trainers longitudinal centerline. The regions are situated in the hypochondriatic areas of the abdomen, exposing the ribs 154 and lungs 158. Intercostal muscle layer 140, mentioned above, is shown to be removable. The intercostal muscle layer 140 covers the cut out areas 124 of the body cover 110. The rib cover 156 is connected to tube 136. Tube 136 can provide air to the rib cover 156 which holds a slight pressure due to being covered by intercostal muscle layer 140. When the chest tube insertion procedure is performed and the intercostal muscle layer 140 is pierced, the trainee experiences a gush of air as in a real procedure. When the trainee inserts his or her finger through the operative site, he or she feels the simulated lung expanding and contracting as would be the case in a real procedure while the air is rushing through the small incision site in the intercostal muscle layer 140. As with other areas which are meant to be incisable, the intercostal muscle layer 140 is preferably fitted with fasteners on the underside of both ends. The ends can be fastened to one another or they can be attached to fasteners on the underside of the rib cage. Alternatively, fasteners in the intercostal muscle layer 140 can be omitted. The remaining structure of the upper torso of the trainer is preferably modeled by a unitary member 160 including a solid piece fabricated from any suitable thermoplastic or polymeric material to model the bone and muscle tissues of the shoulder, neck and back areas and provide shape and form to the trainer.

Figure 8:
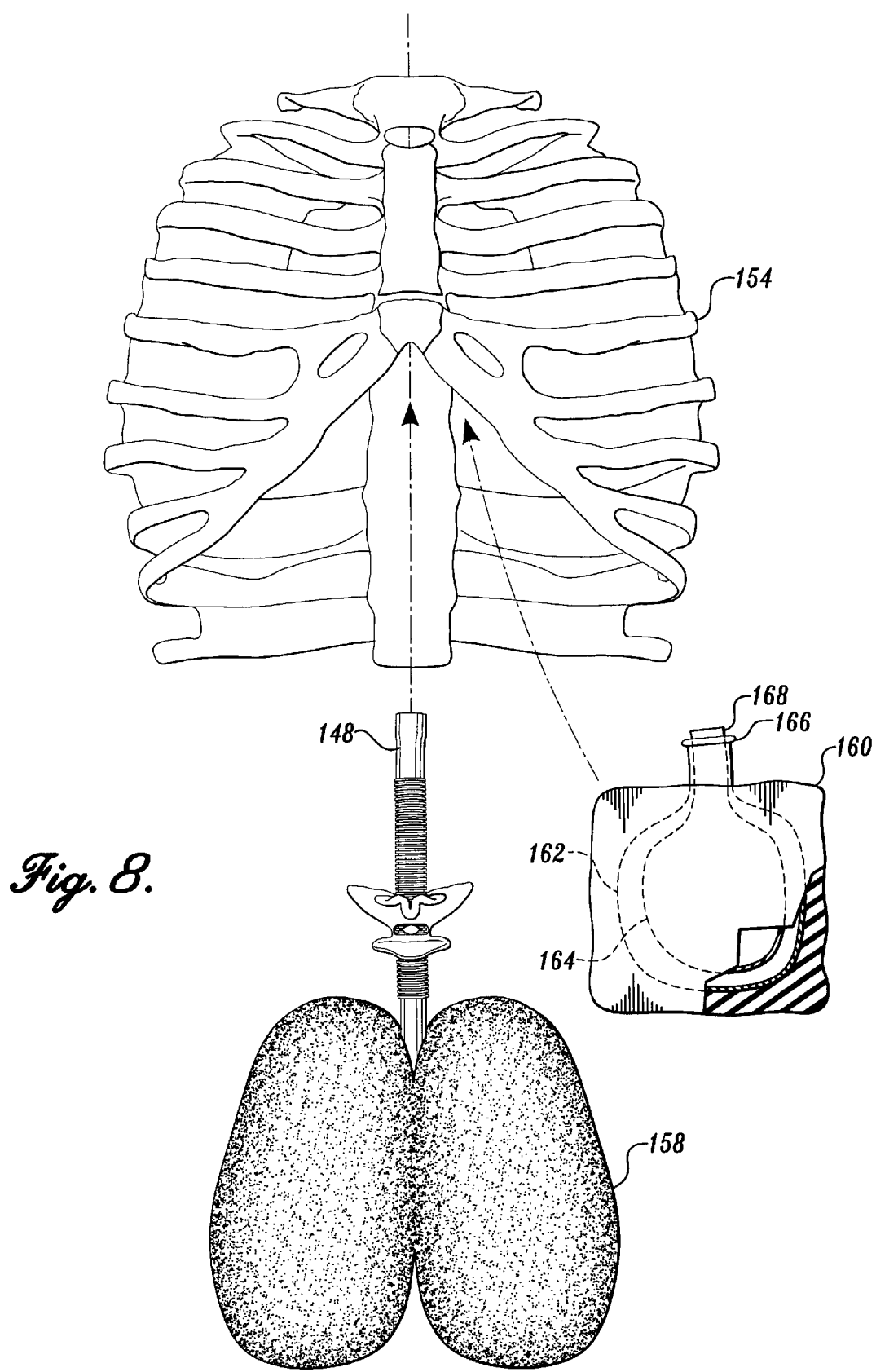
FIG. 8 shows an exploded view of the internal structure of the trainer of FIG. 7.

Referring now to FIG. 8, an exploded view of the internal structures of the trainer 100 is shown. Preferably, the rib cage 154 is formed from a unitary member which includes the backbone and sternum. The ribs 154 are formed from any suitable plastic material. Preferably, spaces are provided between ribs, since procedures may be called for which include inserting medical devices between the ribs. Preferably, lungs 158 are modeled by inflatable oblong sacs which are connected to a simulated bronchial/tracheal tube 148, which in turn is connected at one end to an artificial respirator (not shown). The artificial respirator can be activated during any of the surgical procedures, for example, during chest tube insertion to bring realism to the procedure.

Still referring to FIG. 8, heart block member 160 is inserted within the rib cage 158 to model the human heart. Preferably, the heart block 160 is made of silicone. The heart block 160 includes a simulated pericardium 162 and a simulated heart 164 enclosed within the block 160 of silicone. For purposes of this description, the pericardium can be considered a membranous layer which forms part of the simulated human tissue structure, albeit it is not shown to be bonded thereto. In a human, the pericardium is a sac of serous membrane that envelopes the heart. The pericardium is modeled in the trainer by a layer of a spherical elastomeric material, such as a balloon. The heart is simulated in the trainer by an elastomeric spherical member 164 as well. As seen in FIG. 8, simulated heart 164 is enclosed within the simulated pericardium 162. Outlets 166, 168 for both the simulated pericardium 162 and heart 164 extend from the heart block 160. Preferably, outlets 166, 168 can be connected to supply tubes 136 or 138, depending on whether tube 136 is connected to rib cover 156. Tube 136 or 138 can carry simulated blood formulations to enhance the surgical training experience. Preferably, the simulated pericardium 162 can be filled with simulated blood and the simulated heart 164 can be filled with simulated blood. However, the simulated blood of the heart is of a different hue than the simulated blood of the pericardium. If the trainee is successful in the procedure, he or she will draw simulated blood from the pericardium 162. However, if the trainee is unsuccessful, meaning that he or she has inserted the needle too far and has lacerated the myocardium simulated by elastomeric spherical member 164, he or she will draw a different shade of blood from the simulated heart 164. In this manner, the trainee will learn to recognize the complications associated with pericardiocentesis.

Preferably, the surgical trainer 100 will be used for the following surgical procedures. However, the surgical trainer need not be limited to those enumerated below.

Diagnostic Peritoneal Lavage

The trainer 100 constructed according to the present invention allows one to practice diagnostic peritoneal lavage (DPL). DPL is a diagnostic procedure to be used when a person sustains blunt trauma to the abdomen. DPL basically includes a step to insert a needle with a guidewire through the peritoneum 228 into the abdominal cavity 120. The peritoneum 228 is a serous tissue and therefore a resistance will be encountered. This is modeled in the trainer by the fibrous layer 230 included with the peritoneum 228. Once the needle has penetrated the peritoneum 228, the needle is further inserted a short distance. The needle is then removed leaving the guidewire. A small incision is then made and the peritoneal lavage catheter is inserted over the guidewire into the peritoneal cavity. The guidewire is then removed from the abdominal cavity 120 so that only the lavage catheter remains. Any collection will be analyzed to determine whether surgery is indicated. The trainer 100 according to the present invention provides simulated resistance at the peritoneum 228 and the aspiration of the catheter tube will result in collection of fluid because the abdominal cavity 120 contains simulated blood and or bodily fluid. Complications which may arise during peritoneal lavage include peritonitis due to intestinal perforation from the catheter. The trainer includes simulated intestines 122 filled with simulated bodily fluids, therefore a trainee can experience this if he or she were to puncture the intestine 122. In another alternate of DPL, the procedure includes dissecting with a scalpel through the human tissue structure and inserting the catheter therethrough. Not only this procedure, but any other procedure which includes dissecting tissue can be preformed on the surgical trainer constructed in accordance with the present invention.

Chest Tube Insertion

The trainer 100 constructed according to the present invention allows a trainee to practice chest tube insertion. As with DPL, chest tube insertion is a procedure for use in trauma situations. More specifically, chest tube insertion will aid with patients suffering from a pneumothorax. To perform the procedure, a 2 to 3 centimeter horizontal incision is made in the fifth intercostal space, anterior to the midaxillary line on the affected side. The subcutaneous tissues are dissected to just over the top of the rib. The trainer 100 provides simulated tissue with subcutaneous tissues and ribs, therefore the trainee is provided with this opportunity. The parietal pleura, which in this embodiment is added to intercostal muscle layer 140, is punctured and a gloved finger is inserted into the incision to avoid injury to other organs and to clear any adhesions or clots. The trainer 100 provides this opportunity as well, as the trainee can experience the lungs 158 and ribs 154. The thoracostomy tube is then inserted into the pleural space. Complications encountered in chest tube insertion include laceration or puncture of intrathoracic and or abdominal organs, all of which can be prevented by using the finger technique before inserting the chest tube. Thus, the trainer 100 constructed according to the present invention provides the opportunity for a trainee to perform this step of the procedure as well.

Pericardiocentesis

The trainer 100 constructed according to the present invention allows one to practice pericardiocentesis. Pericardiocentesis is another trauma procedure usually done to evaluate the status of a chronic or recurrent pericardial effusion (fluid in the pericardial sac) as a result of trauma to the chest. It may also be done as a treatment measure to relieve cardiac tamponade (compression of the heart from an accumulation of fluid within the pericardial sac). The procedure includes the steps of puncturing the skin 1 to 2 centimeters inferior and to the left of the xiphochondral junction, at a 45 degree angle to the skin. The needle is advanced cephalad aimed toward the tip of the left scapula. When the needle tip enters the blood-filled pericardial sac (pericardium), the blood can be withdrawn. This is simulated in the trainer 100 having a pericardium 162 filled with simulated blood. A complication of this procedure includes laceration of the myocardium or wall of the heart. This is simulated in the trainer 100 by providing a simulated heart 164 with a different colored simulated blood. If blood from the simulated heart 164 is being aspirated the trainee will recognize this by the change in blood color. Thus, the trainee can experience this complication if he or she were to insert the needle at the incorrect location. Another complication might be puncturing a lung, which can be simulated on the trainer 100 because the trainer provides an inflatable lung 158.

Cricothyroidotomy

The trainer 100 allows one to practice cricothyroidotomy. This procedure is yet another trauma procedure and is performed when a secure airway needs to be maintained. The first step in cricothyroidotomy is to palpate the thyroid notch and cricothyroid interval for orientation. This can be experienced in the trainer 100 of the present invention because these cartilages are reproduced and the simulated human tissue 116 around the neck area is adjusted in thickness to be similar to the human tissue of the neck area. A transverse incision is made over the cricothyroid ligament 146, and the ligament is incised traversely. The incision is opened and an endotracheal tube is inserted into the trachea. The trainer 100 is provided with functioning lungs 158 therefore the trainee can experience lung inflations as would occur in a real procedure.

While the preferred embodiment of the invention has been illustrated and described, it will be appreciated that various changes can be made therein without departing from the spirit and scope of the invention.

What is claimed is:

1. A surgical trainer, comprising:
    a simulated human tissue structure, comprising:
        at least one simulated membranous layer comprising at least one elastomeric layer reinforced by at least one fibrous layer; and
        at least one simulated sub-membranous layer comprising at least one elastomeric layer underlying a first membranous layer, wherein at least one of said at least one simulated membranous layer and said at least one simulated sub-membranous layer has a plurality of integral fluid channels, a material comprising said at least one of said at least one simulated membranous layer and said at least one simulated sub-membranous layer defining walls of the plurality of integral fluid channels.

2. The surgical trainer of claim 1, wherein the at least one membranous layer is a simulation of skin.

3. The surgical trainer of claim 2, wherein the tissue further comprises a second simulated membranous layer comprising at least one elastomeric layer, underlying the first membranous layer.

4. The surgical trainer of claim 3, wherein the second membranous layer is a simulation of the pericardium.

5. The surgical trainer of claim 3, wherein the second membranous layer is reinforced by at least one fibrous layer.

6. The surgical trainer of claim 5, wherein the second membranous layer is a simulation of the peritoneum.

7. The surgical trainer of claim 5, wherein the second membranous layer is a simulation of the parietal pleura.

8. The surgical trainer of claim 5, wherein the second membranous layer is a simulation of the anterior rectus sheath.

9. The surgical trainer of claim 5, wherein the second membranous layer is a simulation of the posterior rectus sheath.

10. The surgical trainer of claim 5, wherein the plurality of integral fluid channels convey a simulated bodily fluid.

11. The surgical trainer of claim 10, wherein the simulated bodily fluid is simulated blood.

12. The surgical trainer of claim 5, wherein the fibrous layers are nylon mesh or felt.

13. The surgical trainer of claim 5, further comprising:
    a simulated abdominal cavity including a simulated internal organ, underlying the simulated human tissue structure.

14. A method of using the surgical trainer of claim 13, comprising:
    simulating diagnostic peritoneal lavage on the trainer.

15. The surgical trainer of claim 13, wherein the abdominal cavity contains simulated bodily fluid.

16. The surgical trainer of claim 13, wherein the internal organ is the intestine.

17. The surgical trainer of claim 16, wherein the intestine contains simulated bodily fluid.

18. The surgical trainer of claim 5, wherein the at least one sub-membranous layer is a simulation of subcutaneous fat.

19. The surgical trainer of claim 5, wherein the at least one sub-membranous layer is a simulation of muscle.

20. The surgical trainer of claim 19, wherein the muscle is intercostal muscle.

21. The surgical trainer of claim 5, wherein the at least one sub-membranous layer is a simulation of extraperitoneal tissue.

22. The surgical trainer of claim 5, wherein the simulated human tissue structure is incisable and replaceable.

23. The surgical trainer of claim 5, further comprising:
    a simulated chest bone structure, underlying the simulated human tissue structure; and
    a simulated lung enclosed within the chest bone structure.

24. A method of using the surgical trainer of claim 23, comprising:
    simulating chest tube insertion on the surgical trainer.

25. The surgical trainer of claim 23, wherein the lung is inflatable and deflatable.

26. The surgical trainer of claim 5, further comprising:
    a simulated heart including at least one elastomeric layer underlying the simulated human tissue structure.

27. A method of using the surgical trainer of claim 26, comprising:
    simulating pericardiocentesis on the surgical trainer.

28. The surgical trainer of claim 26, wherein the heart contains simulated bodily fluids.

29. The surgical trainer of claim 5, further comprising:
    a simulated cricothyroid ligament underlying the simulated human tissue structure;
    a simulated thyroid cartilage underlying the tissue, and attached to the cricothyroid ligament; and
    a simulated cricoid cartilage underlying the tissue, and attached to the cricothyroid ligament.

30. A method of using the surgical trainer of claim 29, comprising:
    simulating cricothyroidotomy on the surgical trainer.

31. The surgical trainer of claim 30, wherein the cricothyroid ligament is incisable and replaceable.

32. The surgical trainer of claim 5, wherein the simulated human tissue structure further comprises a second sub-membranous layer.

33. A method of using the surgical trainer of claim 32, comprising:
    practicing suturing and knot tying on the surgical trainer.

34. A surgical trainer, comprising:
    an incisable simulated human tissue structure, comprising a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, wherein said simulated human tissue structure includes:
        a first simulated membranous layer, said first simulated membranous layer comprising at least one elastomeric layer reinforced by at least one fibrous layer; and
        a first simulated sub-membranous layer disposed below said first simulated membranous layer, said first simulated sub-membranous layer being substantially thicker than said first simulated membranous layer and comprising at least one elastomeric layer having a lower density than any elastomeric layer of the first simulated membranous layer, such that said first simulated sub-membranous layer can readily be dissected using a blunt object;

a second simulated membranous layer disposed below said first simulated sub-membranous layer, and comprising at least one elastomeric layer reinforced by at least one fibrous layer, wherein each elastomeric layer of the second simulated membranous layer has a higher density than any elastomeric layer of the first simulated membranous layer and is selected such that the second simulated membranous layer is relatively harder to dissect than the first simulated membranous layer;

a second simulated sub-membranous layer disposed below said second simulated membranous layer, said second simulated sub-membranous layer being substantially thicker than said first simulated membranous layer and comprising at least one elastomeric layer having a lower density than any elastomeric layer of the second simulated membranous layer;

at least one additional simulated sub-membranous layer disposed below said first simulated sub-membranous layer and comprising at least one elastomeric layer having a lower density than any elastomeric layer of the first simulated membranous layer; and at least one additional simulated membranous layer disposed below said first simulated sub-membranous layer and comprising at least one elastomeric layer, reinforced by at least one fibrous layer, wherein each elastomeric layer of the at least one additional simulated membranous layer has a higher density than any elastomeric layer of the first simulated membranous layer, such that each additional simulated membranous layer is relatively harder to dissect than the first simulated membranous layer.

35. A human tissue structure, comprising:

a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, such that the simulated human tissue structure includes:

a first composite layer corresponding to a simulated membranous layer, said first composite layer comprising at least one elastomeric layer reinforced by at least one fibrous layer;

a first simulated sub-membranous layer disposed below said first composite layer, said first simulated sub-membranous layer being substantially thicker than said first composite layer and comprising at least one elastomeric layer, wherein each elastomeric layer of the first simulated sub-membranous layer has a lower density than any elastomeric layer of the first composite layer, such that said first simulated sub-membranous layer can readily be dissected using a blunt object;

at least one additional composite layer corresponding to a simulated membranous layer disposed below said first simulated sub-membranous layer, and comprising at least one elastomeric layer, reinforced by at least one fibrous layer, wherein each elastomeric layer of the at least one additional composite layer has a higher density than any elastomeric layer of the first composite layer, and wherein each fibrous layer in each additional composite layer has been selected such that each additional simulated membranous layer is relatively harder to dissect than the first simulated membranous layer; and at least one additional simulated sub-membranous layer disposed below said first simulated sub-membranous layer and comprising at least one elastomeric layer, wherein each elastomeric layer of the at least one additional simulated sub-membranous layer has a lower density than any elastomeric layer of the first composite layer and has been selected such that each additional simulated sub-membranous layer is relatively harder to dissect than the first simulated sub-membranous layer.

36. A method for using the human tissue structure of claim 35, comprising:

practicing suturing on the structure.

37. A surgical trainer, comprising:

at least one structure simulating an internal anatomical structure of a human body;

an exterior cover encompassing a substantial portion of the surgical trainer, the exterior cover having at least one opening defining an operative site for a structure, so that each opening is disposed adjacent to a different structure, to facilitate access to said structure; and an incisable simulated human tissue structure disposed to cover each opening, an exterior surface of each simulated human tissue structure being substantially flush with respect to an outer surface of the exterior cover, each simulated human tissue structure being removable from the surgical trainer to be replaced after use, wherein at least one such incisable simulated human tissue comprises a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, the at least one such simulated human tissue structure including:

a first composite layer corresponding to a simulated membranous layer, said first composite layer comprising at least one elastomeric layer reinforced by at least one fibrous layer;

a first simulated sub-membranous layer disposed below said first composite layer, said first simulated sub-membranous layer comprising at least one elastomeric layer, wherein each elastomeric layer of the first simulated sub-membranous layer has a lower density than any elastomeric layer of the first composite layer, such that said first simulated sub-membranous layer can readily be dissected using a blunt object;

at least one additional composite layer corresponding to a simulated membranous layer disposed below said first simulated sub-membranous layer and comprising at least one elastomeric layer, reinforced by at least one fibrous layer, wherein each elastomeric layer of the at least one additional composite layer has a higher density than any elastomeric layer of the first composite layer, such that each additional composite layer corresponding to a simulated membranous layer is relatively harder to dissect than the first simulated membranous layer; and at least one additional simulated sub-membranous layer disposed below said first simulated sub-membranous layer and comprising at least one elastomeric layer, wherein each elastomeric layer of the at least one additional simulated sub-membranous layer has a lower density than any elastomeric layer of the first composite layer.

38. A surgical trainer, comprising:

a plurality of internal structures, each internal structure resembling an internal anatomical structure of a human body;

an exterior cover encompassing a substantial portion of the surgical trainer, the exterior cover having a plurality of predefined openings, each predefined opening defining an operative site, so that each opening is disposed adjacent to a different internal structure, to facilitate access to the internal structure; and a plurality of incisable simulated human tissue structures disposed so that each one of the plurality of predefined openings is substantially covered by at least one of the plurality of incisable simulated human tissue structures such that access to each internal structure via the adjacent predefined opening requires making an incision in at least one of the plurality of incisable simulated human tissue structures, an exterior surface of each simulated human tissue structure being substantially flush with respect to an outer surface of the exterior cover, each simulated human tissue structure being removable to be replaced after use, wherein at least one such incisable simulated human tissue structure comprises plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, the at least one such simulated human tissue structure including:

a first composite layer corresponding to a simulated membranous layer, said first composite layer comprising at least one elastomeric layer reinforced by at least one fibrous layer;

a first simulated sub-membranous layer disposed below said first composite layer and comprising at least one elastomeric layer, wherein each elastomeric layer of the first simulated sub-membranous layer has a lower density than any elastomeric layer of the first composite layer, such that said first simulated sub-membranous layer can readily be dissected using a blunt object;

at least one additional composite layer corresponding to a simulated membranous layer disposed below said first simulated sub-membranous layer and comprising at least one elastomeric layer, reinforced by at least one fibrous layer, wherein each elastomeric layer of the at least one additional composite layer has a higher density than any elastomeric layer of the first composite layer, such that each additional composite layer corresponding to a simulated membranous layer is relatively harder to dissect than the first simulated membranous layer; and at least one additional simulated sub-membranous layer disposed below said first simulated sub-membranous layer and comprising at least one elastomeric layer, wherein each elastomeric layer of the at least one additional simulated sub-membranous layer has a lower density than any elastomeric layer of the first composite layer.

39. A surgical trainer, comprising:

an exterior cover encompassing a substantial portion of the surgical trainer, the exterior cover having a predefined outer opening defining an operative site;

an inner chamber disposed within the exterior cover, said inner chamber including a predefined inner opening disposed adjacent to the predefined outer opening, said inner chamber being configured to hold a charge of pressurized gas when said predefined inner opening is sealed, said inner chamber being coupled in fluid communication with a source of pressurized gas;

an inflatable structure simulating a lung portion disposed within said inner chamber, said inflatable structure being disposed adjacent to the predefined outer opening in the exterior cover and the predefined inner opening, said inflatable structure being coupled in fluid communication with a source of pressurized gas, such that pressurized gas can be provided to said inflatable structure to cause said inflatable structure to inflate, as long as a pressure in said inner chamber is not greater than a pressure provided by the source of pressurized gas to which the inflatable structure is coupled in fluid communication;

a first incisable simulated human tissue structure disposed to cover the predefined outer opening, the first incisable simulated human tissue structure including at least a simulated membranous layer, each simulated membranous layer comprising at least one elastomeric layer and a fiber layer, a surface of the first incisable simulated human tissue structure being substantially flush with respect to an outer surface of the exterior cover, such that when an incision is made that penetrates the first incisable simulated human tissue structure proximate the predefined outer opening, the inner chamber is accessible via the predefined opening; and a second incisable simulated human tissue structure disposed to seal the predefined inner opening, the second incisable simulated human tissue structure including at least a simulated sub-membranous layer, each simulated sub-membranous layer comprising at least one elastomeric layer, an exterior surface of the second incisable simulated human tissue structure being disposed beneath the exterior cover, such that when an incision is made that penetrates the second incisable simulated human tissue structure adjacent to said predefined inner opening, pressurized gas is expelled from the inner chamber through the incision in the second incisable simulated human tissue structure.

40. A surgical trainer, comprising:

an exterior cover encompassing a substantial portion of the surgical trainer, the exterior cover having a predefined opening defining an operative site in an abdominal region of the surgical trainer;

a simulated abdominal cavity disposed underlying the predefined opening defining the operative site, at least one simulated human organ being disposed within said simulated abdominal cavity; and a simulated human tissue structure disposed to cover said predefined opening, an outer surface of said simulated human tissue structure being substantially flush with respect to an outer surface of the exterior cover, a portion of said simulated human tissue structure extending below said exterior cover, said human tissue structure being incisable to access the simulated abdominal cavity, said human tissue structure comprising a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, wherein each simulated human tissue structure includes:

a first composite layer corresponding to a simulated membranous layer, said first composite layer comprising at least one elastomeric layer reinforced by at least one fibrous layer;

a first simulated sub-membranous layer disposed below said first composite layer, said first simulated sub-membranous layer being substantially thicker than said first composite layer and comprising at least one elastomeric layer, wherein each elastomeric layer of the first simulated sub-membranous layer has a lower density than any elastomeric layer of the first composite layer, such that said first simulated sub-membranous layer can readily be dissected using a blunt object;

at least one additional composite layer corresponding to a simulated membranous layer disposed below said first simulated sub-membranous layer, and comprising at least one elastomeric layer, reinforced by at least one fibrous layer, wherein each elastomeric layer of the at least one additional composite layer has a higher density than any elastomeric layer of the first composite layer, such that each additional composite layer corresponding to a simulated membranous layer is relatively harder to dissect than the first simulated membranous layer; and at least one additional simulated sub-membranous layer disposed below said first simulated sub-membranous layer and comprising at least one elastomeric layer, wherein each elastomeric layer of the at least one additional simulated sub-membranous layer has a lower density than any elastomeric layer of the first composite layer.

41. A surgical trainer, comprising:
a simulated human tissue structure, comprising:
a simulated membranous layer comprising an elastomeric layer reinforced by at a fibrous layer; and
a simulated sub-membranous layer comprising an elastomeric layer underlying the membranous layer, wherein one of the simulated membranous layer and the simulated sub-membranous layer has a plurality of integral fluid channels, a material comprising said one of the simulated membranous layer and the simulated sub-membranous layer defining walls of the plurality of integral fluid channels.

42. For use in a surgical trainer, an incisable simulated human tissue structure comprising:
a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, such that the simulated human tissue structure includes:
a first simulated membranous layer having an elastomeric layer reinforced by a fibrous layer selected to reproduce a resistance to cutting exhibited by actual human membranous tissue;

a first simulated sub-membranous layer disposed below said first simulated membranous layer, said first simulated sub-membranous layer being substantially thicker than said first simulated membranous layer and including an elastomeric layer having a lower density than the elastomeric layer of the first simulated membranous layer and selected to substantially tactilely simulate human subcutaneous fat, such that said first simulated sub-membranous layer can readily be dissected using a blunt object;

a second simulated membranous layer disposed below said first simulated sub-membranous layer and including an elastomeric layer reinforced by a fibrous layer, wherein the elastomeric layer of the second simulated membranous layer has a higher density than the elastomeric layer of the first simulated membranous layer and is selected to reproduce a resistance to cutting exhibited by actual corresponding human membranous tissue, such that the second simulated membranous layer is relatively harder to dissect than the first simulated membranous layer;

a second simulated sub-membranous layer disposed below said second simulated membranous layer, said second simulated sub-membranous layer being substantially thicker than said first simulated membranous layer and comprising an elastomeric layer having a lower density than the elastomeric layer of the second simulated membranous layer and selected to reproduce a texture and hardness exhibited by actual human muscle tissue;

an additional simulated sub-membranous layer disposed below said first simulated sub-membranous layer and including an elastomeric layer having a lower density than the elastomeric layer of the first simulated membranous layer and being selected to reproduce a texture and hardness exhibited by actual corresponding human sub-membranous tissue; and an additional simulated membranous layer disposed below said first simulated sub-membranous layer and including an elastomeric layer reinforced by a fibrous layer, wherein the elastomeric layer of the additional simulated membranous layer has a higher density than the elastomeric layer of the first simulated membranous layer, and wherein the fibrous layer in the additional simulated membranous layer is selected to reproduce a resistance to cutting exhibited by actual human membranous tissue.

43. An incisable simulated human tissue structure, comprising a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, at least one sub-membranous layer being readily dissected using a blunt object, a membranous layer disposed at a top of said incisable simulated human tissue structure being less dense and relatively easier to dissect than each other membranous layer, the plurality of simulated membranous layers and simulated sub-membranous layers being disposed such that at least one simulated membranous layer is adjacent to at least one simulated sub-membranous layer.

44. An incisable simulated human tissue structure, comprising a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, such that said simulated human tissue structure includes:
- a first simulated membranous layer, said first simulated membranous layer comprising at least one elastomeric layer reinforced by at least one fibrous layer; and
- a first simulated sub-membranous layer disposed below said first simulated membranous layer, said first simulated sub-membranous layer being substantially uniform in appearance and substantially thicker than said first simulated membranous layer, comprising at least one elastomeric layer having a lower density than any elastomeric layer of the first simulated membranous layer, such that said first simulated sub-membranous layer can readily be dissected using a blunt object;
- a second simulated membranous layer disposed below said first simulated sub-membranous layer, and comprising at least one elastomeric layer reinforced by at least one fibrous layer, wherein each elastomeric layer of the second simulated membranous layer has a higher density than any elastomeric layer of the first simulated membranous layer and is selected such that the second simulated membranous layer is relatively harder to dissect than the first simulated membranous layer; and
- a second simulated sub-membranous layer disposed below said second simulated membranous layer, said second simulated sub-membranous layer being substantially thicker than said first simulated membranous layer and comprising at least one elastomeric layer having a lower density than any elastomeric layer of the second simulated membranous layer.

45. An incisable simulated human tissue structure, comprising a plurality of simulated membranous layers and a plurality of simulated sub-membranous layers, each simulated membranous layer being relatively denser than any simulated sub-membranous layer, each simulated sub-membranous layer being relatively thicker than any simulated membranous layer, and each simulated sub-membranous layer being relatively easier to dissect than any simulated membranous layer, such that said simulated human tissue structure includes:
- a first simulated membranous layer, said first simulated membranous layer comprising at least one elastomeric layer reinforced by at least one fibrous layer;
- a first simulated sub-membranous layer disposed below said first simulated membranous layer, said first simulated sub-membranous layer being substantially thicker than said first simulated membranous layer, and comprising at least one elastomeric layer having a lower density than any elastomeric layer of the first simulated membranous layer, such that said first simulated sub-membranous layer can readily be dissected using a blunt object;
- a second simulated membranous layer disposed below said first simulated sub-membranous layer, and comprising at least one elastomeric layer reinforced by at least one fibrous layer, wherein each elastomeric layer of the second simulated membranous layer has a higher density than any elastomeric layer of the first simulated membranous layer and is selected such that the second simulated membranous layer is relatively harder to dissect than the first simulated membranous layer; and
- a second simulated sub-membranous layer disposed below said second simulated membranous layer, said second simulated sub-membranous layer being substantially thicker than said first simulated membranous layer and comprising:
    - at least one elastomeric layer having a lower density than any elastomeric layer of the second simulated membranous layer; and
    - a plurality of vessels filled with simulated blood.

46. A surgical trainer including a simulated chest cavity and simulated lungs, comprising:
- an exterior cover encompassing a substantial portion of the surgical trainer, the exterior cover having a predefined outer opening defining an operative site;
- an inner chamber disposed within the exterior cover, the inner chamber including a predefined inner opening disposed adjacent to the predefined outer opening, the inner chamber being configured to hold a charge of a pressurized gaseous fluid when said predefined inner opening is sealed, the inner chamber being coupled in fluid communication with a source of pressurized gaseous fluid;
- a first incisable simulated human tissue structure disposed to cover the predefined outer opening, the first incisable simulated human tissue structure including at least a simulated membranous layer, each simulated membranous layer comprising at least one elastomeric layer, a surface of the first incisable simulated human tissue structure being substantially flush with respect to an outer surface of the exterior cover, such that when an incision is made that penetrates the first incisable simulated human tissue structure proximate the predefined outer opening, the inner chamber is accessible via the predefined opening; and
- a second incisable simulated human tissue structure disposed to seal the predefined inner opening, the second incisable simulated human tissue structure including at least a simulated sub-membranous layer, each simulated sub-membranous layer comprising at least one elastomeric layer, an exterior surface of the second incisable simulated human tissue structure being disposed beneath the exterior cover, such that when an incision is made that penetrates the second incisable simulated human tissue structure adjacent to said predefined inner opening, air is expelled from the inner chamber through the incision in the second incisable simulated human tissue structure.

47. The surgical trainer of claim 46, further comprising an inflatable structure simulating a lung portion disposed within said inner chamber, said inflatable structure being coupled in fluid communication with the source of pressurized gaseous fluid, such that the inflatable structure is not in fluid communication with the inner chamber.

* * * * *